United States Patent Office

3,663,512
Patented May 16, 1972

3,663,512
PROCESS FOR THE PREPARATION OF HIGH MOLECULAR WEIGHT POLYESTERS FOR INJECTION MOULDING PURPOSES
Rudolf Uebe, Hofheim, Taunus, Germany, assignor to Farbwerke Hoechst Aktiengesellschaft vormals Meister Lucius & Brüning, Frankfurt am Main, Germany
No Drawing. Filed July 1, 1970, Ser. No. 51,741
Claims priority, application Germany, July 9, 1969, P 19 34 719.4
Int. Cl. C08f *17/013*
U.S. Cl. 260—75 R            11 Claims

ABSTRACT OF THE DISCLOSURE

A process for the preparation of linear saturated polyesters of aromatic dicarboxylic acids and saturated aliphatic or cycloaliphatic diols, using carboxylic acid manganese salts as transesterification catalysts, which contain from 3 to 20 carbon atoms in the anion and an epoxy group. The said polyesters are suitable for injection-moulding purposes.

---

The present invention relates to a process for the preparation of high molecular weight polyesters for injection moulding purposes.

In order to prepare high molecular weight polyesters it is possible to proceed by transesterifying the ester of a dicarboxylic acid and a low molecular weight aliphatic alcohol with an excess amount of a diol and by subjecting the bishydroxy-alkyl ester obtained to polycondensation.

It has been known to use salts of low molecular weight aliphatic carboxylic acids as catalysts for transesterification and polycondensation for the preparation of high molecular weight polyesters, such as polyethylene terephthalate. Thus German Pat. No. 1,007,600 describes a process according to which manganese acetate serves as transesterification catalyst. In accordance with U. S. Pat. No. 2,951,060 manganese salts of aliphatic mono- and hydroxycarboxylic acids having up to 6 carbon atoms are used for the preparation of polyesters. British Pat. No. 753,880 describes a process in which Cd, Co. Zn or Mn salts of aliphatic monocarboxylic acids having from 2 to 6 carbon atoms or of dicarboxylic acids having from 2 to 10 carbon atoms are used.

The present invention provides a process for the preparation of linear saturated polyesters of aromatic dicarboxylic acids, which acids may, optionally, contain up to 10% by weight of aliphatic dicarboxylic acids with saturated aliphatic or cycloaliphatic diols, in which process carboxylic acid manganese salts $(RCOO)_2Mn$ are used as a transesterification catalyst, the carboxylic acid anion having from 3 to 20, preferably from 5 to 18 carbon atoms and an epoxy group. The epoxy group can be present at any possible position of the saturated or unsaturated aliphatic, cycloaliphatic, aromatic-aliphatic radical R of the carboxylic acid manganese salt. In addition to the epoxy group, the radical R may contain oxygen atoms that are bound in ether-like manner.

Transesterification catalysts of this kind are of special significance if the polyester, for example polyethylene terephthalate, is to be used as initial substance for the preparation of thermoplastic moulding compositions for injection moulding. Surprisingly, it was found that the manganese salts of the invention, which contain a reactive anion due to the epoxy group, modify the polyester in such a way that there is a conspicuous improvement of the injection moulding properties of thermoplastic moulding compositions on the basis of high molecular weight polyesters. Comparative experiments have shown that the known transesterification and polycondensation catalysts cannot contribute to the solution of the problems which are found in the process of injection moulding of polyester compositions. Thus, for example, problems arising in connection with the removal from the mould have to be solved with the injection moulding process, since injection-moulded parts from an unmodified polyester material strongly stick to the walls of the mould. Furthermore, the unmodified polyester moulding material tends to form a flash at the edges of the moulded part, even if the pressure during dwell time in the injection moulding process is adjusted in such a way that the mould is just filled.

If epoxidized carboxylic acid manganese salts are used, the injection moulded parts do not show any flash, even with the application of higher injection pressures. At the same time there is a noticeable increase in the crystallinity of the moulded parts produced. However, it is of special significance that the manganese salts in accordance with the invention strongly influence the capability of being removed from the mould of the injection-moulded parts. Comparative experiments have shown that the addition of mould release auxiliaries is no more necessary, because the moulded parts come off the mould easily, even after a dwell time in the mould of 5 seconds.

As catalysts for transesterification and polycondensation there can be used, for example, the manganese salts of 9,10-epoxy-stearic acid, 2,3-epoxy-3-methyl-2-decyl-butyric acid, 10,11-epoxy-undecylenic acid, glycidic acid, 2,3-epoxy-hexanoic acid, 4,5-epoxy-cyclo-octane-carboxylic acid, 3,4-epoxy-cyclohexane-carboxylic acid, of the glycidyl ether of glycolic acid, and of the glycidyl ether of p-hydroxybenzoic acid.

It is generally sufficient to use from 0.0001 to 0.005 mole percent of the manganese compound, calculated on the molar amount of the low molecular weight dicarboxylic acid ester used for transesterification.

In order to prepare the polyesters, the low molecular weight esters, such as methyl ester, of aromatic dicarboxylic acids, such as terephthalic acid, are reacted with diols, for example ethylene glycol, and the bishydroxy-alkyl esters thus obtained are subjected to polycondensation while distilling off the excess diol. According to this principle it is also possible to prepare modified polyethylene terephthalate which contains, in addition to terephthalic acid, other aromatic or aliphatic dicarboxylic acids as structural units, for example isophthalic acid, naphthalene dicarboxylic acid-(2,6) or adipic acid. Moreover, modified polyethylene terephthalates can be prepared which contain, in addition to ethylene glycol, other aliphatic diols, such as neopentyl glycol or butanediol-(1,4) as alcoholic component. It is also possible to use polyesters of hydroxy-carboxylic acids.

The preparation of a polyethylene terephthalate that is suitable for injection moulding consists virtually of the following operations:

(1) Transesterification of dimethyl terephthalate with ethylene glycol while using the catalysts in accordance with the invention.

(2) Polycondensation of the diglycol terephthalate thus obtained to give polyethylene glycol terephthalate, which can either be effected by using the manganese salt as catalyst, or with the addition of known polycondensation catalysts, such as $Sb_2O_3$, $GeO_2$ or $GeHPO_3$. The melt condensation is advantageously effected up to a RSV value in the range of from 0.6 to 1.1 dl./g.

(3) Solid condensation of the granules obtained after discharging the melt to obtain a higher RSV value. The polyester shall have a reduced specific viscosity (RSV value measured with a solution of 1% strength in phenol and tetrachloroethane 60:40 at 25° C.) of between 0.6 and 2.0 dl./g., preferably between 0.9 and 1.6 dl./g. Especially suitable are polyesters with a reduced specific viscosity of between 1.1 and 1.5 dl./g.

In order to obtain optimum properties of an injection-moulded article manufactured from this polyester, a crystallization promoting agent is added to the polyester. Suitable for this purpose are solid inert inorganic substances, such as talcum, koalin, titanium dioxide, aluminium oxide, calcium, carbonate and other substances having a particle size of less than 5μ. They are used in an amount of from 0.05 to 2, preferably from 0.1 to 0.5% by weight, calculated on the polyester.

The crystallization promoting agent can be added separately before, during or after the polycondensation. It is also possible, however, to apply the inorganic crystallization promoting substance to the finished polyester granules by rolling and subsequently incorporate it into the polyethylene terephthalate mass by means of melting in an extruder. Also, the moulding composition can be injection-moulded directly after the application of the crystallization promoting agent by means of rolling.

The general working procedure provides that all operations have to be effected with the exclusion of air and humidity in order to prevent discoloration and hydrolysis of the polyester. The polyester moulding composition shall preferably contain less than 0.01% by weight of water. If a fast crystallization in the mould and thus a short moulding cycle are to be obtained, the mould has to be maintained at a temperature of at least 100° C. Mould temperatures of between 120° C. and 150° C. are most advantageous.

The following examples serve to illustrate the invention.

EXAMPLE 1

(1.1) A mixture of 10 kg. of dimethyl terephthalate, 8.8 of ethylene glycol and 10 g. of manganese-9,10-epoxy-stearate was heated at 225° C., while stirring, and methanol was separated by means of a column, until the transesterification had been completed. Subsequently, excess glycol was distilled off by means of an increase in temperature. After 40 g. of talcum had been added, 3.5 g. of germanium phosphite were added as polycondensation catalyst, the temperature of the melt was raised to 285° C. and the pressure was reduced to 1 to 0.2 torr. After a total of 3.5 hours, calculated from the beginning of the vacuum program, the polycondensation which was effected with the separation of ethylene glycol was completed; a RSV value of 0.88 dl./g. was measured.

(1.2) The granules obtained after the discharging of the melt and granulating of the polyester strand (particle size of 1.5 x 2 x 2 mm.) were at first sharply dried at 180° C. under oil-pump vacuum and were then subjected for 8 hours to solid condensation at 235° C. and 0.05 torr. In this process a RSV value of 1.450 dl./g. was reached; the water content of the granules was 0.005% by weight. Subsequently, the moulding composition was injection-moulded into sheets having the measurements of 60 x 60 x 2 mm.: cylinder temperature: 270° C./260° C./260° C.; moulding temperature: 140° C.; injection time: 15 sec.; injection pressure: 140 atmospheres gauge. The dwell time in the mould was varied in order to judge the adherence of the sheets to the mould (1st series) and the pressure during dwell time was varied, too, in order to measure the size of the flash (2d series). The results are shown in the following table.

EXAMPLE 2

(2.1) A mixture of 10 kg. of dimethyl terephthalate, 8.8 kg. of ethylene glycol and 6 g. of manganese salt of 10,11-epoxy-undecylenic acid was subjected, analogous to the process of Example 1.1, to transesterification and polycondensation. The same polycondensation time was required; the RSV value of the colorless polyester mass obtained was 0.90 dl./g.

(2.2) The polyester granules obtained were brought to a RSV value of 1.450 dl./g. within 8 hours, while the conditions specified in Example 1.2 were maintained. The water content of the granules was 0.005%. Subsequently, the finished injection-moulding mass was processed into sheets—again under the same moulding conditions as in Example 1.2, after which process a series of 100 sheets each time was subjected to evaluation. The quality of the sheets was equivalent to that of Example 1, i.e. they exhibited plane and smooth surfaces and showed an excellent capability of being removed from the mold, even after a dwell time in the mould of only 10 seconds, and they did not show any flash until a pressure during dwell time of more than 130 atmospheres gauge had been applied. The table below gives a summary of the results.

EXAMPLE 3

(3.1) In order to give a comparison, a polyester mass was prepared analogous to the process of Example 1.1., using 3.45 g. of manganese acetate as transesterification catalyst. The time of transesterification was equal to that of the preceding experiments, the polycondensation took 4 hours. Colorless granules having a RSV value of 0.87 dl./g. were obtained.

(3.2) The melt condensation was followed by the solid condensation. Under the conditions specified in Example 1.2., the time for reaching a RSV value of 1.450 dl./g. was 9 hours. The water content of the granules was 0.005%. Subsequently, a series of 100 sheets were produced with the same machine setting as in 1.2 and with variation of the dwell time in the mould and the pressure during dwell time. The sheets exhibited a flash already under a pressure during dwell time of 80 atmospheres gauge, with 130 atmospheres gauge it was 2 mm. The capability of being removed from the mould of the sheets was far less favorable than with the sheets of Examples 1.2 and 2.2. Up to a dwell time in the mould of 45 seconds the sheets showed a strong adherence to the mould and did not exhibit smooth and plane surfaces. The results are given in the following table.

| Example | Polyester moulding composition | Transesterification catalyst | RSV [1] of the granules prior to injection moulding, dl./g. | 1st series: mould release properties with different dwell times | | |
|---|---|---|---|---|---|---|
| | | | | Dwell time (sec.) | 100 sheets ejected | Density, d. |
| 1 | Polyethylene terephthalate with 0.4% by weight of talcum. | Manganese-9,10-epoxy-stearate. | 1.450 | 5 | 95 | 1.375 |
| | | | | 10 | 99 | 1.375 |
| | | | | 15 | 100 | 1.376 |
| | | | | 2d series: flash with different pressures during dwell time | | |
| | | | | Pressure (atm. gauge) | | Flash (mm.) |
| | | | | 60 | | None. |
| | | | | 100 | | None. |
| | | | | 140 | | 0.05 |

See footnote at end of table.

TABLE—Continued

| Example | Polyester moulding composition | Transesterification catalyst | RSV[1] of the granules prior to injection moulding, dl./g. | 1st series: mould release properties with different dwell times ||| 
|---|---|---|---|---|---|---|
| | | | | Dwell time (sec.) | 100 sheets ejected | Density, d. |
| 2 | Polyethylene terephthalate with 0.4% by weight of talcum. | Manganese salt of 10,11-epoxyundecylenic acid. | 1.450 | 5 | 96 | 1.375 |
| | | | | 10 | 100 | 1.375 |
| | | | | 15 | 100 | 1.376 |

2d series: flash with different pressures during dwell time

| Pressure (atm. gauge) | Flash (mm.) |
|---|---|
| 60 | None. |
| 100 | None. |
| 140 | 0.05 |

| Example | Polyester moulding composition | Transesterification catalyst | RSV | | | |
|---|---|---|---|---|---|---|
| 3 | Polyethylene terephthalate with 0.4% by weight of talcum. | Manganese acetate | 1.450 | 1st series: mould release with different dwell times |||

| Dwell time (sec.) | 100 sheets ejected | Density, d. |
|---|---|---|
| 5 | 54 | 1.373 |
| 10 | 67 | 1.373 |
| 15 | 89 | 1.374 |

2d series: flash with different pressures during dwell time

| Pressure (atm. gauge) | Flash (mm.) |
|---|---|
| 60 | 0.05 |
| 100 | 1.5 |
| 140 | 3 |

[1] RSV=reduced specific viscosity.

I claim:

1. In a process for the preparation of a high molecular weight, moldable, linear saturated polyester of an aromatic dicarboxylic acid with a saturated aliphatic or cycloaliphatic diol which comprises transesterification of a low molecular weight alkyl ester of said aromatic dicarboxylic acid in the presence of a catalyst and polycondensation of the resulting bishydroxy-alkyl ester, the improvement which comprises conducting the transesterification in the presence of from 0.0001 to 0.005 mol percent, calculated on the dicarboxylic acid ester, of a manganese salt of a carboxylic acid containing 3 to 20 carbon atoms and an epoxy group.

2. The process of claim 1, wherein the anions of the carboxylic acid manganese salt contain 5 to 18 carbon atoms and one epoxy group.

3. The process of claim 1, wherein the transesterification catalyst is a manganese salt of an acid selected from the group consisting of 9,10-epoxy-stearic acid, 2,3-epoxy-3-methyl-2-decyl-butyric acid, 10,11-epoxy-undecylenic acid, glycidic acid, 2,3-epoxy-hexanoic acid, 4,5-epoxy-cyclo-octane-carboxylic acid, 3,4-epoxy-cyclohexane-carboxylic acid, the glycidyl ether of glycolic acid, and the glycidyl ether of p-hydroxy-benzoic acid.

4. The process of claim 1, wherein the aromatic dicarboxylic acid is terephthalic acid.

5. The process of claim 1, wherein the diol is slected from the group consisting of ethylene glycol, cyclohexane-1,4-dimethylol, neopentyl glycol and butanediol-(1,4).

6. The process of claim 1 wherein the low molecular weight alkyl ester of an aromatic dicarboxylic acid is dimethyl terephthalate.

7. The process of claim 1 wherein the aromatic dicarboxylic acid contains up to 10 percent by weight of acid selected from the group consisting of isophthalic acid, naphthalene dicarboxylic acid and adipic acid.

8. The process of claim 1 wherein a crystallization promoting agent is added before, during or after the polycondensation.

9. The process of claim 8 wherein the crystallization promoting agent is a solid inert inorganic substance having a particle size of less than 5 microns.

10. The process of claim 8, wherein the crystallization promoting agent is added in an amount of from 0.05 to 2 percent by weight, calculated on the polyester.

11. The process of claim 9, wherein the crystallization promoting agent is selected from the group consisting of talcum, kaolin, titanium dioxide, aluminum oxide and calcium carbonate.

References Cited

UNITED STATES PATENTS

| 2,951,060 | 8/1960 | Billica | 260—75 |
| 3,446,763 | 5/1969 | Okuzumi | 260—22 |

FOREIGN PATENTS

| 985,217 | 3/1965 | Great Britain. |
| 985,218 | 3/1965 | Great Britain. |

OTHER REFERENCES

Polyesters, vol. 2, Parkyn et al., published 1967, New York, N.Y., American Elsevier Publishing Co., Inc., title page and page 87.

MELVIN GOLDSTEIN, Primary Examiner

U.S. Cl. X.R.

260—22 EP, 75 EP; 264—328